United States Patent
Han et al.

(10) Patent No.: US 10,439,236 B2
(45) Date of Patent: Oct. 8, 2019

(54) AIR SUPPLY DEVICE USING COOLING WATER HEATER OF FUEL CELL VEHICLE

(71) Applicant: Hyundai Motor Company, Seoul (KR)

(72) Inventors: Su Dong Han, Gyeonggi-do (KR); Hyung Kook Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 377 days.

(21) Appl. No.: 14/564,753

(22) Filed: Dec. 9, 2014

(65) Prior Publication Data

US 2016/0036072 A1 Feb. 4, 2016

(30) Foreign Application Priority Data

Jul. 31, 2014 (KR) ........................ 10-2014-0097975

(51) Int. Cl.
- *H01M 8/04119* (2016.01)
- *H01M 8/04029* (2016.01)
- *H01M 8/04082* (2016.01)
- *H01M 8/04223* (2016.01)
- *H01M 8/04228* (2016.01)
- *H01M 8/04225* (2016.01)

(52) U.S. Cl.
CPC ... *H01M 8/04126* (2013.01); *H01M 8/04029* (2013.01); *H01M 8/04201* (2013.01); *H01M 8/04225* (2016.02); *H01M 8/04228* (2016.02); *H01M 8/04231* (2013.01); *H01M 2250/20* (2013.01); *Y02T 90/32* (2013.01)

(58) Field of Classification Search
CPC ......... H01M 8/04126; H01M 8/04228; H01M 8/04225; H01M 8/04201; H01M 8/04231; H01M 8/04029; H01M 8/04; H01M 2250/20

USPC ........................................................ 429/413
See application file for complete search history.

(56) References Cited

U.S. PATENT DOCUMENTS

| | | | | |
|---|---|---|---|---|
| 2001/0055707 A1* | 12/2001 | Roberts | ............. | H01M 8/04007 429/413 |
| 2002/0106545 A1* | 8/2002 | Lim | .................. | H01M 8/04007 429/413 |

(Continued)

FOREIGN PATENT DOCUMENTS

| | | | | |
|---|---|---|---|---|
| JP | 2004-273347 A | | 9/2004 | |
| JP | 2007-0242547 | * | 9/2007 | .............. H01M 8/04 |

(Continued)

OTHER PUBLICATIONS

English Translation of JP2007-0242547.*

*Primary Examiner* — Milton I Cano
*Assistant Examiner* — Suphia Quraishi
(74) *Attorney, Agent, or Firm* — Mintz Levin Cohn Ferris Glovsky and Popeo, P.C.; Peter F. Corless

(57) ABSTRACT

An air supply device using a cooling water heater of a fuel cell vehicle can effectively reduce cold starting time of the fuel cell vehicle and effectively remove moisture in a stack in cold shut down (CSD) of the fuel cell vehicle. In the air supply device, a bypass flow path is formed to be branched from a first air supply line connected between an air blower for supplying air to a fuel cell stack and a humidifier for humidifying the air supplied to the stack. The bypass flow path allows air exhausted from the air blower to pass through a cooling water heater by bypassing the humidifier and then to be supplied to the stack.

6 Claims, 3 Drawing Sheets

(56) References Cited

U.S. PATENT DOCUMENTS

| | | | | |
|---|---|---|---|---|
| 2002/0164509 | A1* | 11/2002 | Wheat ............... | H01M 8/04126 |
| | | | | 429/413 |
| 2006/0093881 | A1* | 5/2006 | Tanaka .............. | H01M 8/04007 |
| | | | | 429/434 |
| 2006/0121322 | A1* | 6/2006 | Haas ................. | H01M 8/04141 |
| | | | | 429/413 |
| 2006/0263654 | A1* | 11/2006 | Goebel ............. | H01M 8/04119 |
| | | | | 429/413 |

FOREIGN PATENT DOCUMENTS

| | | |
|---|---|---|
| JP | 2007-242547 A | 9/2007 |
| KP | 10-2010-0122181 | 11/2010 |
| KR | 10-2009-0006593 | 1/2009 |
| KR | 10-0893431 B1 | 4/2009 |
| KR | 10-2011-0006527 | 1/2011 |
| KR | 10-2011-0045113 | 5/2011 |
| KR | 10-2011-0077472 A | 7/2011 |
| KR | 10-2014-0029791 | 3/2014 |

* cited by examiner

AIR SUPPLY DEVICE USING COOLING WATER HEATER OF FUEL CELL VEHICLE

CROSS-REFERENCE TO RELATED APPLICATION

This application claims under 35 U.S.C. § 119(a) the benefit of Korean Patent Application No. 10-2014-0097975 filed Jul. 31, 2014, the entire contents of which are incorporated herein by reference.

BACKGROUND (a) Technical Field

The present invention relates to an air supply device using a cooling water heater of a fuel cell vehicle, more particularly, to an air supply device using a cooling water heater of a fuel cell vehicle, which can effectively reduce cold starting time of the fuel cell vehicle and effectively remove moisture in a stack in cold shut down (CSD) of the fuel cell vehicle.

(b) Description of the Related Art

Recently, car manufacturers have had great interest in hydrogen fuel cell vehicles as green vehicles. Many problems remain to be solved with regard to the development of hydrogen fuel cell vehicles. Among these problems, a particularly difficult problem is to guarantee cold starting capability.

In order to facilitate cold starting of a fuel cell vehicle, cooling water is not circulated into a stack in cold starting of the fuel cell vehicle. This is for the purpose of allowing the cooling water not to flow into the stack. Therefore, a cooling water heater (i.e., a heater for heating cooling water) that is an essential component of cooling water circulation is turned off in the cold starting, and the cold starting is delayed due to non-operation of the heater.

In this state, the current of the stack is consumed by operating an air blower or the like in order to induce the stack to generate heat. This has a problem of causing noise and energy loss through air exhaust.

In cold shut down (CSD) of an existing fuel cell vehicle, moisture generated during driving is removed by variably supplying, to a stack, air passing through an air blower and a humidifier, depending on a temperature of cooling water. In this state, when the moisture is not effectively discharged as air from the stack, this has a negative influence on subsequent cold starting of the fuel cell vehicle.

In particular, if the air supplied to the stack in the cold starting of the fuel cell vehicle is cooled by passing through the humidifier, the temperature raising speed of the stack and the air are reduced. As a result, the cold starting of the fuel cell vehicle is delayed, where the cold starting of the fuel cell stack is completed based on the exit temperature cooling water and air.

In the loop structure of a inline connection cooling system of pump-heater-stack, if a heater is operated in cold starting or regenerative braking, a problem is caused in that the heater is damaged due to overheating as long as cooling water is not circulated.

SUMMARY

The present invention provides an air supply device using a cooling water heater of a fuel cell vehicle, in which the temperatures of cooling water and air are simultaneously raised in cold starting of the fuel cell vehicle by using a cooling water heater of a fuel cell cooling system with an air supply system, so that the time for cold starting of the fuel cell vehicle can be effectively reduced.

The present invention also provides an air supply device using a cooling water heater of a fuel cell vehicle, which can effectively remove moisture inside a stack by raising the temperature of air using a cooling water heater in cold shut down (CSD) of the fuel cell vehicle, and improve the entire performance of the fuel cell vehicle by effectively cooling a heater under a non-circulation condition of cooling water in regenerative braking of the fuel cell vehicle in the loop structure of a cooling system of a pump-heater-stack.

In one aspect, the present invention provides an air supply device using a cooling water heater of a fuel cell vehicle, where a bypass flow path is formed to be branched from a first air supply line connected between an air blower for supplying air to a fuel cell stack and a humidifier for humidifying the air supplied to the stack, and where the bypass flow path allows air exhausted from the air blower to pass through a cooling water heater by bypassing the humidifier and then to be supplied to the stack.

In an exemplary embodiment, an air flow control valve for connecting between the bypass flow path and the first air supply line may be provided to the first air supply line. The air flow control valve may control the flow direction of the air exhausted from the air blower.

In another exemplary embodiment, the air flow control valve may close the bypass flow path and open the first air supply line so that the air exhausted from the air blower flows in the stack through the humidifier, or the air flow control valve may open the bypass flow path and close the first air supply line so that the air exhausted from the air blower flows in the stack through the cooling water heater by bypassing the humidifier.

In still another exemplary embodiment, in cold starting of the fuel cell vehicle, the air flow control valve may open the bypass flow path and close the first air supply line so that the air of which temperature is raised by being exhausted from the air blower flows in the stack through the cooling water heater by bypassing the humidifier.

In yet another exemplary embodiment, in cold shut down (CSD) or shut down of the fuel cell vehicle, the air flow control valve may open the bypass flow path and close the first air supply line so that the air of which temperature is raised by being exhausted from the air blower flows in the stack through the cooling water heater by bypassing the humidifier.

In still yet another exemplary embodiment, the bypass flow path may supply, to the stack, the air exhausted from the air blower by passing through the cooling water heater, through a second air supply line connected between the humidifier and the stack.

In a further exemplary embodiment, the cooling water heater may heat cooling water supplied to the stack, and include a heater body through which the cooling water passes and at least one heating element built in the heater body to heat the cooling water flowed in the heater body. An air flow path connected to the bypass flow path may be formed inside the heating element.

Other aspects and exemplary embodiments of the invention are discussed infra.

The air supply device according to the present invention has advantages as follows.

First, the cooling water heater of the existing fuel cell cooling system is commonly used with the air supply system, so that the temperatures of cooling water and air can be simultaneously raised in cold starting of the fuel cell vehicle, thereby reducing the time for cold starting of the fuel cell vehicle.

Second, the cooling water heater can be cooled through only the circulation of air without circulating cooling water in regenerative braking of the fuel cell vehicle in the structure of the cooling system of pump-heater-stack, thereby improving the entire performance of the fuel cell vehicle.

Third, moisture inside the stack can be effectively removed through air of which temperature is raised twice through the air blower and the cooling water heater in CSD and general shut down of the fuel cell vehicle.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
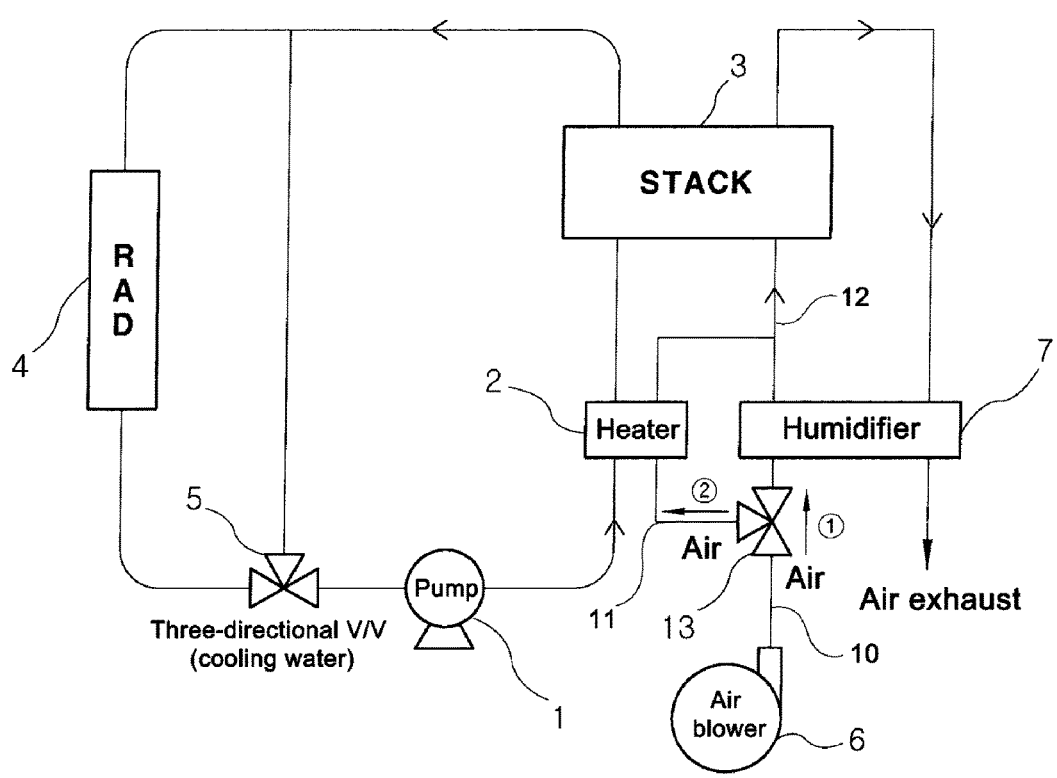
FIG. 1 is a view showing an air supply device using a cooling water heater of a fuel cell vehicle according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the present invention, a cooling water heater of a fuel cell vehicle is commonly used in a cooling system and an air supply system, so that it is possible to reduce cold starting time and to cool the cooling water heater even under a non-circulation condition of cooling water. Further, it is possible to effectively remove moisture in a stack through a two-step temperature raising process performed by an air blower and the cooling water heater in cold shut down (CSD) and general shut down of the fuel cell vehicle.

As is known in the art, the circulation of cooling water supplied to a stack 3 along a loop consisting of a cooling water pump 1, a cooling water heater 2, a fuel cell stack 3, a radiator 4, and a cooling water flow control valve 5 (in this order) is performed in the cooling system of the fuel cell vehicle, and the supply and exhaust of air supplied to the stack 3 through a loop consisting of an air blower 6, an air humidifier 7, the stack 3, the air humidifier 7, and air exhaust (in this order) are performed in the air supply system of the fuel cell vehicle (see FIG. 1).

FIG. 1 is a configuration view showing an air supply device using a cooling water heater of a fuel cell vehicle according to an embodiment of the present invention.

Referring to FIG. 1, a bypass flow path 11 through which air exhausted from the air blower 6 is exhausted to the stack 3 without passing through the humidifier 7 (i.e., by detouring away from or bypassing the humidifier 7) is formed to be branched from a first air supply line 10 connected between the air blower 6 and the humidifier 7.

The bypass flow path 11 is formed to be connected to an exit of the stack 3 by passing through the cooling water heater 2.

In other words, one end of the bypass flow path 11 is connected to the first air supply line 10 between the air blower 6 and the humidifier 7, and the other end of the bypass flow path 11 is connected to a second air supply line 12 connected between the humidifier 7 and the stack 3.

In this state, an air flow control valve 13 for controlling the flow direction of air exhausted from the air blower 6 is mounted between the bypass flow path 11 and the first air supply line 10.

The air flow control valve 13 preferably is a three-directional valve that connects between the bypath flow path 11 and the first air supply line 10. The air flow control valve 13 guides the flow of the air exhausted from the air blower 6 to the humidifier 7 or the bypass flow path 11.

The air flowed in the bypass flow path by the air flow control valve 13 is heated while passing through the cooling water heater 2 and then supplied to the stack 3. The air flow control valve 13 may be operated by an actuator, a controller and the like, which control the operation of the valve.

Figure 2:
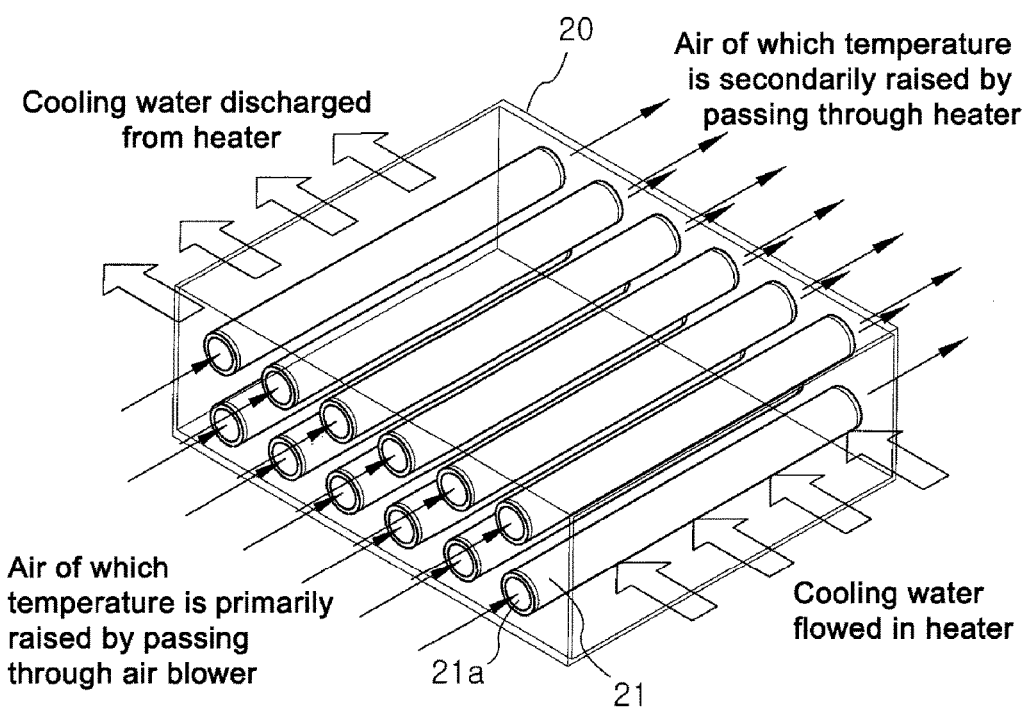
FIGS. 2 and 3 are schematic views showing the internal structure of the cooling water heater and the flow of air according to the embodiment of the present invention.
Figure 3:
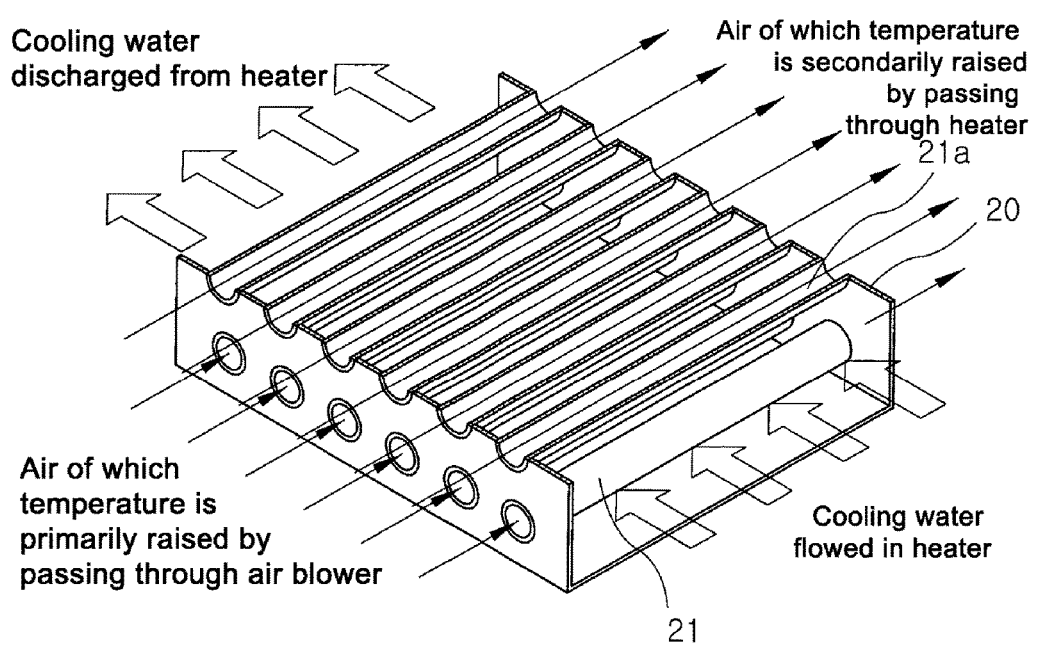

Referring to FIGS. 2 and 3, the cooling water heater 2 is configured to include a heater body 20 for allowing cooling water to flow in the fuel cell stack 3 by circulating a cooling water line, and a plurality of heating elements 21 built in the heater body 20 to heat cooling water flowed in the heater body 20.

The heating element 21 may be formed in the shape of a straight pipe with an annular section surrounding an air flow path 21a formed therein.

In this state, the heating element 21 is disposed to extend in the lateral direction in the heater body 20, and both ends of the heating element 21 are fixedly adhered to both left and right surfaces of the heater body 20, respectively. The heating element 21 is integrally connected to the bypass flow path 11 so that air can flow between the air flow path 21 in the heating element 21 and the bypass flow path 11.

The direction of air flowing in the air flow path 21a in the heating element 21 and the direction of cooling water flowing in the heater body 20 are at right angles to each other.

In this state, the cooling water that flows in the heater body 20 is heated due to heat generation of the heating element 21 while flowing to the outside of the heating element 21. This enables the heater 2 to operate even when the flow of the cooling water is stopped, i.e., when the driving of the cooling water pump 1 is stopped. When the driving of the cooling water pump 1 is stopped, the cooling of the heater 2 results from cooling caused by natural convection of the cooling water and cooling caused by circulation of the air flowing in the air flow path 21a inside the heating element 21.

For example, the heating element 21 is an insulator that generates heat by means of electric resistance, and the surface of the heating element 21 may be configured to be waterproof. The heater body 20 has a cooling water entrance for allowing the cooling water to flow therein and a cooling water exit for allowing the cooling water to be discharged therefrom. The cooling water entrance and the cooling water exit are respectively formed at both front and rear surfaces of the heater body 20. For example, a component for preventing movement of the heating element 21 due to the flow of the cooling water, etc., and supporting the heating element 21 may be built in the heater body 20.

Hereinafter, the flow of air in the air supply device according to an operation condition of the fuel cell vehicle will be described.

First, when the fuel cell vehicle is driven with normal power, the air flow control valve 13 closes the bypass flow path 11 and opens the first air supply line 10 so that the flow of air (see ① of FIG. 1) is formed toward the humidifier 7.

In this state, the air of which temperature is raised in the air blower 6 is humidified by passing through the humidifier 7 and then supplied to the stack 3.

Next, in cold starting and regenerative braking of the fuel cell vehicle or in CSD and general shut down of the fuel cell vehicle, the air flow control valve 13 opens the bypass flow path 11 and closes the first air supply line 10 so that the flow of air (see ② of FIG. 1) is formed toward the cooling water heater 2.

In this state, the air which temperature is raised in the air blower 6 is heated while passing through the inside of the heating element 21 of the cooling water heater 2, so that the temperature of the air is again raised. The air heated twice through the air blower 6 and the cooling water heater 2 rapidly warms up the inside of the stack 3 at a proper time, e.g., in cold starting or CSD and general shut down of the fuel cell vehicle.

As a result, the temperature of the cooling water and the temperature of the air are simultaneously raised in the cold starting, so that the time for cold starting of the fuel cell vehicle can be reduced. Further, moisture inside the stack can be effectively removed by the high-temperature air of which temperature is heated twice in the CSD and general shut down of the fuel cell vehicle.

In addition, the cooling water heater 2 can be cooled by the cooling caused by the natural convection of the cooling water and the cooling caused by the circulation of air passing through the air flow path 21a inside the heating element 21, without forcibly circulating the cooling water using the cooling water pump 1 in the regenerative braking of the fuel cell vehicle.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An air supply device using a cooling water heater of a fuel cell vehicle, comprising:
   a bypass flow path formed to be branched from a first air supply line connected between an air blower for supplying air to a fuel cell stack and a humidifier for humidifying the air supplied to the stack, and
   the bypass flow path allowing air exhausted from the air blower to pass through the cooling water heater by bypassing the humidifier when cold starting or cold shut down or shut down of the vehicle,
   wherein the air in the bypass flow path is heated while passing through the inside of the cooling water heater and flows into the stack,
   wherein an air flow control valve for connecting between the bypass flow path and the first air supply line is provided to the first air supply line, and wherein the air flow control valve controls a flow direction of the air exhausted from the air blower, and
   wherein, in cold starting of the fuel cell vehicle, the air flow control valve opens the bypass flow path and closes the first air supply line so that the air of which temperature is raised by being exhausted from the air blower flows in the stack through the cooling water heater by bypassing the humidifier.

2. The air supply device of claim 1, wherein the air flow control valve closes the bypass flow path and opens the first air supply line so that the air exhausted from the air blower flows in the stack through the humidifier, or the air flow control valve opens the bypass flow path and closes the first air supply line so that the air exhausted from the air blower flows in the stack through the cooling water heater by bypassing the humidifier.

3. The air supply device of claim 1, wherein, in cold shut down (CSD) or shut down of the fuel cell vehicle, the air flow control valve opens the bypass flow path and closes the first air supply line so that the air of which temperature is raised by being exhausted from the air blower flows in the stack through the cooling water heater by bypassing the humidifier.

4. The air supply device of claim 1, wherein the bypass flow path supplies, to the stack, the air exhausted from the air blower by passing through the cooling water heater, through a second air supply line connected between the humidifier and the stack.

5. The air supply device of claim 1, wherein the cooling water heater heats cooling water supplied to the stack, and includes a heater body through which the cooling water passes and at least one heating element built in the heater body to heat the cooling water flowed in the heater body, and wherein an air flow path connected to the bypass flow path is formed inside the heating element.

6. A method of reducing cold starting time of a fuel cell vehicle, comprising the steps of:
    providing an air supply device using a cooling water heater of the fuel cell vehicle;
    forming a bypass flow path of the air supply device to be branched from a first air supply line connected between an air blower for supplying air to a fuel cell stack and a humidifier for humidifying the air supplied to the stack, and
    allowing air exhausted from the air blower to pass through the cooling water heater of the air supply device by bypassing the humidifier and then to be supplied to the stack,
wherein the air in the bypass flow path is heated while passing through the inside of the cooling water heater and flows into the stack,
wherein an air flow control valve for connecting between the bypass flow path and the first air supply line is provided to the first air supply line, and wherein the air flow control valve controls a flow direction of the air exhausted from the air blower, and
wherein, in cold starting of the fuel cell vehicle, the air flow control valve opens the bypass flow path and closes the first air supply line so that the air of which temperature is raised by being exhausted from the air blower flows in the stack through the cooling water heater by bypassing the humidifier.

* * * * *